(12) United States Patent
Arai et al.

(10) Patent No.: US 10,691,055 B2
(45) Date of Patent: Jun. 23, 2020

(54) IMAGE FORMING APPARATUS

(71) Applicant: CANON KABUSHIKI KAISHA, Tokyo (JP)

(72) Inventors: Akihiro Arai, Toride (JP); Yutaka Ando, Toride (JP); Toshiyuki Miyake, Nagareyama (JP); Riki Fukuhara, Funabashi (JP); Yuichiro Oda, Nagareyama (JP)

(73) Assignee: Canon Kabushiki Kaisha, Tokyo (JP)

( * ) Notice: Subject to any disclaimer, the term of this patent is extended or adjusted under 35 U.S.C. 154(b) by 121 days.

(21) Appl. No.: 15/991,932

(22) Filed: May 29, 2018

(65) Prior Publication Data

US 2018/0348687 A1   Dec. 6, 2018

(30) Foreign Application Priority Data

May 31, 2017 (JP) .................. 2017-108239

(51) Int. Cl.
 *G03G 15/00* (2006.01)
 *G03G 15/20* (2006.01)
 *H04N 1/00* (2006.01)

(52) U.S. Cl.
 CPC ....... *G03G 15/607* (2013.01); *G03G 15/2064* (2013.01); *G03G 15/655* (2013.01);
 (Continued)

(58) Field of Classification Search
 CPC .............. G03G 15/607; G03G 15/2064; G03G 15/6511; G03G 15/655;
 (Continued)

(56) References Cited

U.S. PATENT DOCUMENTS

2001/0018626 A1* 8/2001 Moriyama ........... G03G 15/655
                                                            700/223
2010/0074637 A1* 3/2010 Shiraishi ................ B65H 1/266
                                                            399/23
(Continued)

FOREIGN PATENT DOCUMENTS

EP   0798607 A2   10/1997
EP   2075634 A1   7/2009
(Continued)

*Primary Examiner* — David H Banh
(74) *Attorney, Agent, or Firm* — Canon U.S.A., Inc. I.P. Division

(57) ABSTRACT

An image forming apparatus configured to change an interleaf control mode from a not confirmed sheet-feeding mode to a sheet-presence confirmed sheet-feeding mode when a remaining amount of recording sheets is less than a first threshold, wherein the image forming apparatus has a first mode of changing a feeding origin of a recording sheet, according to detection of absence of a recording sheet in a storage unit by a sheet presence/absence detection unit during execution of an image forming job, and a second mode of changing a feeding origin of a recording sheet, according to detection of a recording-sheet remaining amount of the storage unit less than a second threshold during execution of an image forming job, and wherein the second threshold is larger than the first threshold for changing an interleaf control mode.

4 Claims, 8 Drawing Sheets

(52) U.S. Cl.
CPC ..... *G03G 15/6508* (2013.01); *G03G 15/6511* (2013.01); *H04N 1/00167* (2013.01); *G03G 2215/00725* (2013.01); *G03G 2215/00729* (2013.01); *G03G 2215/00869* (2013.01); *G03G 2215/00894* (2013.01)

(58) Field of Classification Search
CPC .......... G03G 2215/00725; G03G 2215/00729; G03G 2215/00869; G03G 2215/00894; G03G 15/6508; H04N 1/00167
See application file for complete search history.

(56) References Cited

U.S. PATENT DOCUMENTS

| | | | | |
|---|---|---|---|---|
| 2012/0070214 A1* | 3/2012 | Okutsu | ................ | G03G 15/234 399/388 |
| 2015/0105231 A1* | 4/2015 | Ishikawa | ................ | B65H 31/10 493/320 |
| 2018/0348688 A1* | 12/2018 | Yumoto | ............. | G03G 15/2064 |
| 2018/0348689 A1* | 12/2018 | Ando | ................ | G03G 15/655 |

FOREIGN PATENT DOCUMENTS

| | | | |
|---|---|---|---|
| JP | 2003221160 A | 8/2003 |
| JP | 2007065323 A | 3/2007 |
| JP | 2009286577 A | 12/2009 |

\* cited by examiner

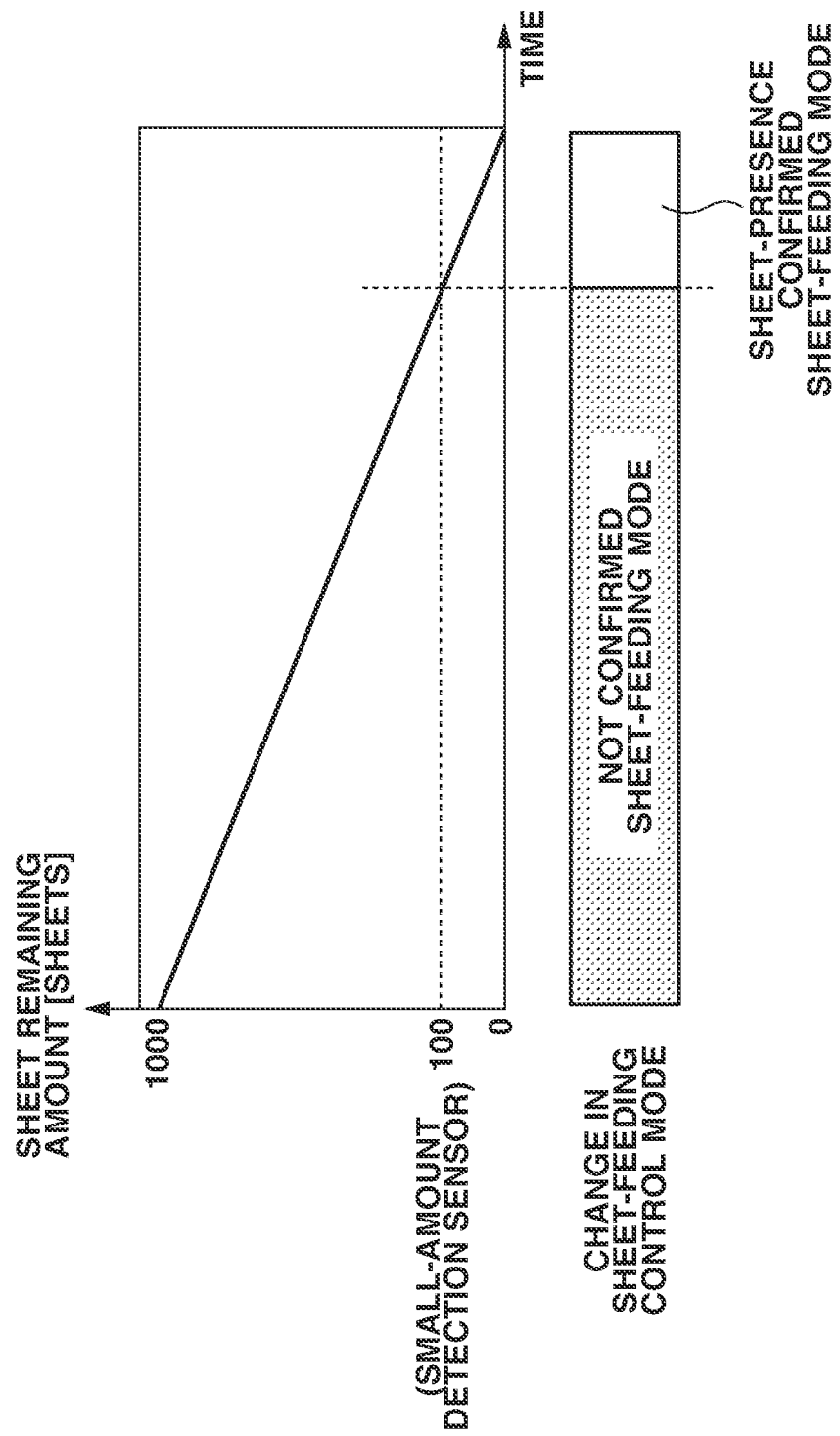

IMAGE FORMING APPARATUS

BACKGROUND OF THE INVENTION

Field of the Invention

The present invention relates to an image forming apparatus having a function of inserting an interleaf.

Description of the Related Art

An image forming apparatus to which an inserter for inserting an interleaf is connected is known. The inserter inserts an interleaf between recording sheets on each of which an image has been formed. Japanese Patent Application Laid-Open No. 2003-221160 discusses the following technique. The inserter includes an interleaf tray for loading the interleaf. The interleaf is supplied from this interleaf tray, and then inserted between the recording sheets conveyed from the image forming apparatus.

There are two modes for controlling interleaf feeding. One is a mode called "sheet-presence confirmed sheet-feeding mode". When an interleaf is to be fed from the inserter in the sheet-presence confirmed sheet-feeding mode, determination of whether feeding of the interleaf is possible is made after it is determined that a recording sheet immediately before the insertion of the interleaf is stored in a sheet feeding unit of the image forming apparatus. The interleaf is then fed. There is a feeding preparation time from when the feeding of the interleaf is determined to be possible until when the interleaf is actually fed. Because of this feeding preparation time in the sheet-presence confirmed sheet-feeding mode, the distance between the immediately preceding recording sheet and the interleaf increases, and therefore the productivity is reduced.

The other mode is a mode called "not confirmed sheet-feeding mode". In the not confirmed sheet-feeding mode, when an interleaf is to be fed from the inserter, feeding of the interleaf begins without waiting for determination of whether a recording sheet immediately before the insertion of the interleaf is present in the sheet feeding unit of the image forming apparatus. Therefore, the productivity can be improved as compared with the sheet-presence confirmed sheet-feeding mode. However, on the other hand, the following case can occur in the not confirmed sheet-feeding mode: after the feeding of the interleaf begins, the recording sheet immediately before the insertion of the interleaf is found to be absent in the sheet feeding unit. In this case, the fed interleaf remains inside as a jammed sheet. This is because, if this interleaf is forcibly discharged, the page order of a product becomes incorrect. In the conventional image forming apparatus, the sheet-presence confirmed sheet-feeding mode and the not confirmed sheet-feeding mode described above are each set as a fixed mode of the apparatus.

Japanese Patent Application Laid-Open No. 2009-286577 discusses a technique of a case where sheets in a sheet feeding unit run out during the execution of a job, the sheet feeding unit is automatically changed to another sheet feeding unit storing recording sheets of the same type. A method for such an automatic change is known. This method is called "auto cassette change". According to Japanese Patent Application Laid-Open No. 2007-065323, it is also possible to perform processing for changing a sheet feeding unit based on auto cassette change, before running out of sheets. The method of Japanese Patent Application Laid-Open No. 2007-065323 is called a paper-remaining auto cassette change. This method changes a sheet feeding unit to the next sheet feeding unit, before paper in the sheet feeding unit runs out. This can prevent productivity from declining due to a wait for the next sheet feeding unit to become ready.

SUMMARY OF THE INVENTION

The present invention is directed to suppressing a decline in productivity, by performing the above-described paper-remaining auto cassette change, before a change of an interleaf-feeding control mode.

According to an aspect of the present invention, an image forming apparatus includes a storage unit configured to store a recording sheet, an image forming unit configured to form an image on a recording sheet fed from the storage unit, a first detection unit configured to detect the presence or absence of a recording sheet stored in the storage unit, a second detection unit configured to detect a remaining amount of recording-sheets in of the storage unit, an insertion unit including an interleaf tray configured to load an interleaf fed from the interleaf tray between recording sheets conveyed from the image forming unit, and a control unit configured to control the timing of start of interleaf feeding by the insertion unit, based on a detection result of the second detection unit, the control unit being configured to start interleaf feeding from the interleaf tray regardless of a detection result of the first detection unit, in a case where the recording-sheet remaining amount of the storage unit is more than a first threshold, and the control unit being configured to start interleaf feeding from the interleaf tray based on a detection result of the first detection unit, in a case where the recording-sheet remaining amount of the storage unit is less than the first threshold, wherein the image forming apparatus has a first mode of changing the feeding origin of a recording sheet, according to the detection of the absence of a recording sheet in the storage unit by the first detection unit during execution of an image forming job, and a second mode of changing the feeding origin of a recording sheet, according to detection of a recording-sheet remaining amount of the storage unit being less than a second threshold during execution of an image forming job, and wherein the second threshold is larger than the first threshold.

Further features of the present invention will become apparent from the following description of exemplary embodiments with reference to the attached drawings.

BRIEF DESCRIPTION OF THE DRAWINGS

FIG. 6 is a diagram illustrating a change of a sheet-feeding mode for an interleaf.

DESCRIPTION OF THE EMBODIMENTS

An exemplary embodiment of the present invention will be described with reference to the attached drawings. Components described in the present exemplary embodiment are only examples, and the present invention is not limited to the description of the exemplary embodiment.

(Overall Configuration)

Figure 1:
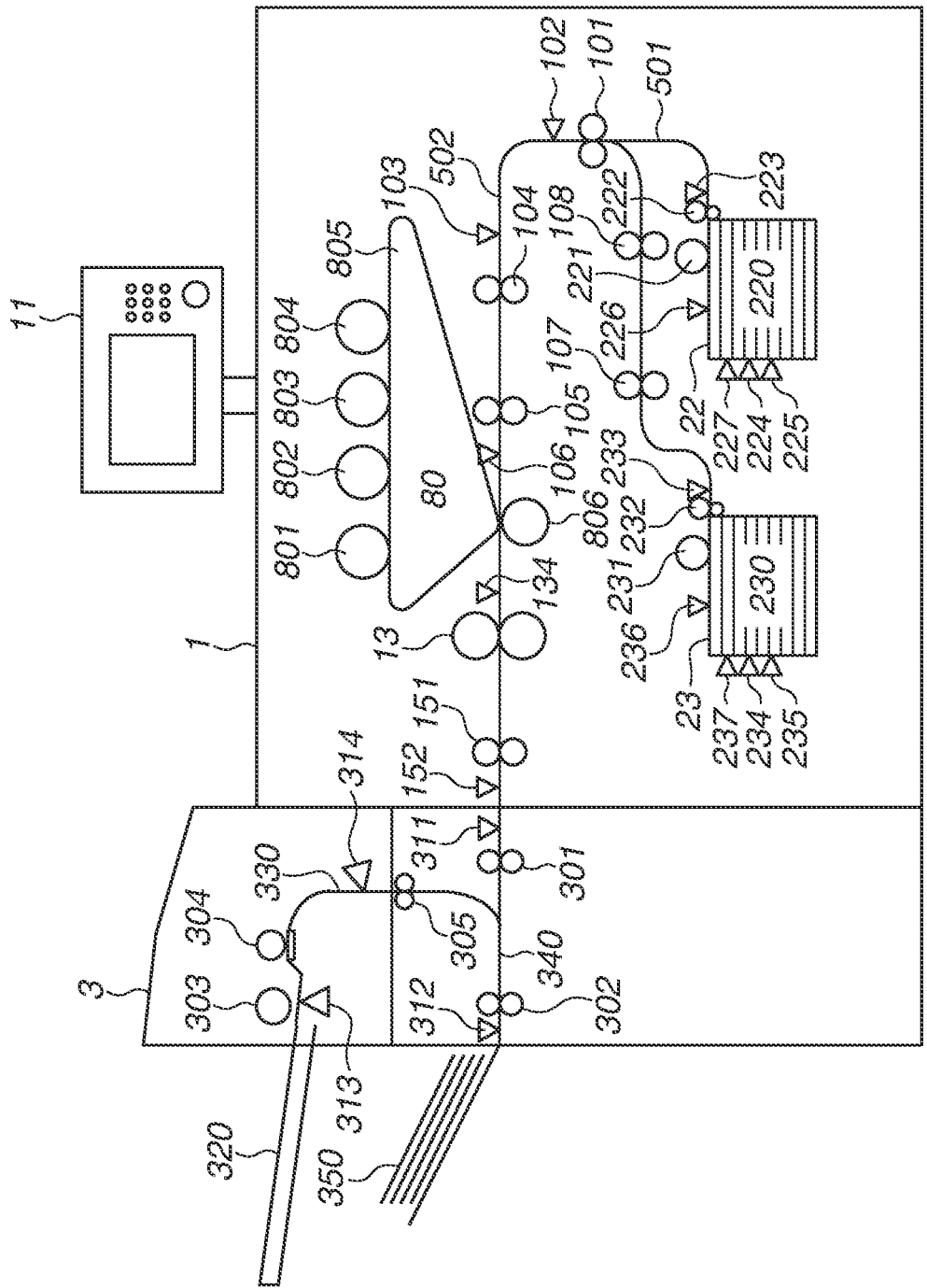
FIG. 1 is a cross-sectional diagram illustrating an image forming apparatus.

FIG. 1 illustrates an image forming apparatus 1 of the present exemplary embodiment. In the present exemplary embodiment, an inserter 3 is connected to the image forming apparatus 1. The inserter 3 can insert an interleaf between recording sheets. The inserter 3 is connected at a position downstream from an image forming unit 80 in a recording-sheet conveyance direction. The image forming apparatus 1 equipped with the inserter 3 will be described below.

The image forming apparatus 1 can execute a job for successively performing image formation on recording sheets. There is a case where a sheet feeding unit runs out of recording sheets, during the execution of such a job. In this case, the image forming apparatus 1 automatically changes to another sheet feeding unit without stopping the job, when recording sheets of the same type and size as those of the current recording sheets are stored in this sheet feeding unit. In the present exemplary embodiment, this function will be referred to as "no-paper auto cassette change (ACC)". Further, the image forming apparatus 1 of the present exemplary embodiment has a function of changing from a sheet feeding unit 22 to a sheet feeding unit 23, at a stage where a recording-sheet remaining amount of the sheet feeding unit 22 decreases to a predetermined threshold (a second threshold), before sheets run out. The sheet feeding unit 22 is a first sheet feeding unit, and the sheet feeding unit 23 is a second sheet feeding unit. In the present exemplary embodiment, this function will be referred to as "paper-remaining ACC". The paper-remaining ACC changes to the second sheet feeding unit before running out of the recording sheets of the first sheet feeding unit, and can therefore prevent productivity from declining due to a wait for the next sheet feeding unit to become ready.

The image forming apparatus 1 is an electrophotographic-type image forming apparatus. The image forming apparatus 1 includes the sheet feeding unit 22 serving as the first sheet feeding unit and the sheet feeding unit 23 serving as the second sheet feeding unit. The image forming apparatus 1 further includes the image forming unit 80 for forming an image on a recording sheet fed from each of the sheet feeding units 22 and 23. The image forming apparatus 1 further includes a user interface 11, and executes a job such as a copy job or a print job, according to a user instruction from the user interface 11. When a user instruction for executing a job is provided, recording sheets are fed from the sheet feeding unit 22 one by one, and the image forming unit 80 forms an image on each of the recording sheets. The sheet feeding unit 22 includes a paper storage 220 for storing recording sheets. The paper storage 220 is controlled in such a manner that the uppermost sheet is brought into contact with a pickup roller 221 by a lifter motor 202 and a sheet surface sensor 226. The sheet surface sensor 226 is a sheet presence/absence detection unit for detecting the presence or absence of a recording sheet. Specifically, in response to the passage of the trailing end of a recording sheet through a sheet feeding sensor 223 after this recording sheet is actually fed, the sheet surface sensor 226 detects the presence of the next recording sheet.

Further, in a case where the sheet surface sensor 226 is not ON even though position control is performed by the lifter motor 202, it is determined that there is no recording sheet. This also holds true for a sheet surface sensor 236 and a lifter motor 204 of the sheet feeding unit 23.

A near empty sensor 224 is an optical sensor for detecting an amount of remaining recording sheets stored in the paper storage 220, and a near empty sensor 234 is an optical sensor for detecting an amount of remaining recording sheets stored in a paper storage 230. Each of the near empty sensors 224 and 234 is an example of a sheet remaining amount detection unit (a second detection unit). The near empty sensors 224 and 234 each determine that the recording-sheet remaining amount is large in a case where a sensor light receiving portion is covered by a sheet. The near empty sensors 224 and 234 each determine that the recording-sheet remaining amount is small in a case where the sensor light receiving portion is not covered to receive light. The near empty sensors 224 and 234 are each turned ON when the recording-sheet remaining amount exceeds the second threshold, and are each turned OFF when the recording-sheet remaining amount falls below the second threshold. In the present exemplary embodiment, the near empty sensors 224 and 234 are each used as a sheet-feeding-unit change condition in a paper-remaining ACC mode (a second mode). Specifically, in a case where the mode of the ACC is the paper-remaining ACC, if each of the near empty sensors 224 and 234 is turned OFF, the recording-sheet remaining amount is determined to be less than the second threshold, and the sheet feeding unit being currently used is changed to another sheet feeding unit. In the paper-remaining ACC mode (the second mode), a change to the next sheet feeding unit occurs before the current sheet feeding unit runs out of recording sheets. Therefore, the productivity can be prevented from declining due to a wait for the next sheet feeding unit to become ready.

A cassette change sensor 225 is an optical sensor for detecting if the amount of remaining recording sheets stored in the paper storage 220 has reached a remaining amount for starting operation preparatory to a sheet-feeding-unit change in the paper-remaining ACC. A cassette change sensor 235 is a similar optical sensor for the paper storage 230. Each of the cassette change sensors 225 and 235 is an example of the sheet remaining amount detection unit. In a case where a sensor light receiving portion is covered by a sheet, the cassette change sensors 225 and 235 each determine that the current recording-sheet remaining amount is still an amount not requiring the start of preparation of a change-destination sheet feeding unit. In a case where the sensor light receiving portion is not covered to receive light, the cassette change sensors 225 and 235 each determine that the current recording-sheet remaining amount is an amount requiring the start of preparation of a change-destination sheet feeding unit. Further, the cassette change sensor 225 is disposed at a position for changing from a light-shielding state to a light-transmission state when the recording-sheet remaining amount is larger than that for the near empty sensor 224. The cassette change sensor 235 is similarly disposed with regard to the near empty sensor 234.

Each of interleaf feeding mode change sensors 227 and 237 is an optical sensor for detecting if the amount of remaining recording sheets stored in the paper storage has reached a remaining amount (a first threshold) for changing an interleaf control mode from an not confirmed sheet-feeding mode to a sheet-presence confirmed sheet-feeding mode. Each of the interleaf feeding mode change sensors 227 and 237 is an example of the sheet remaining amount detection unit. The interleaf feeding mode change sensors 227 and 237 each operate in the not confirmed sheet-feeding mode, in a case where a sensor light receiving portion is covered by a sheet. The interleaf feeding mode change sensors 227 and 237 each operate in the sheet-presence confirmed sheet-feeding mode, in a case where the sensor light receiving portion is not covered to receive light. The interleaf feeding mode change sensor 227 is disposed at a position for changing from a light-shielding state to a light-transmission state when the recording-sheet remaining amount is larger than that for the near empty sensor 224. The interleaf feeding mode change sensor 237 is similarly disposed with regard to the near empty sensor 234.

In the present exemplary embodiment, the interleaf feeding mode change sensors 227 and 237 as well as the near empty sensors 224 and 234 are disposed in such a manner that the second threshold is larger than the first threshold.

The pickup roller 221 sends the uppermost sheet in the paper storage 220 to a sheet feeding roller 222. Similarly, a pickup roller 231 sends the uppermost sheet in the paper storage 230 to a sheet feeding roller 232. Each of the sheet feeding rollers 222 and 232 has an upper roller and a lower roller. The upper roller rotates in a feed direction, and the lower roller rotates in a return direction, thereby separating recording sheets to feed the recording sheets one by one.

Using the sheet feeding sensor 223, whether the uppermost sheet has been successfully picked up at a predetermined timing is confirmed. This also holds true for a sheet feeding sensor 233. When each of the sheet feeding sensors 223 and 233 is turned ON, the feeding of the uppermost sheet is determined to be successful. On the other hand, in a case where each of the sheet feeding sensors 223 and 233 is not ON even if a predetermined time or more has elapsed after the start of the pickup, the pickup is determined to be unsuccessful, and the image forming apparatus 1 stops as a jam stop. Meanwhile, in a case where each of the sheet feeding sensors 223 and 233 is not OFF, even if a predetermined time or more has elapsed since the passage of the trailing end of a recording sheet. The image forming apparatus 1 also stops as a jam stop (hereinafter referred to as "dwell jam").

The recording sheet passing through each of the sheet feeding rollers 222 and 232 is conveyed to a vertical path 501. Subsequently, after passing through a vertical path sensor 102, the recording sheet is guided to a horizontal path 502 by a vertical path roller 101. The recording sheet is then conveyed to the image forming unit 80 where an image is transferred to this recording sheet. The image forming unit 80 includes drums 801 to 804, an intermediate transfer member 805, and a secondary transfer unit 806.

Using a pre-registration sensor 103, a pre-registration roller 104, a registration roller 105, and a registration sensor 106, the image forming apparatus 1 aligns the leading end of the image in the image forming unit 80 and the leading end of the recording sheet on the horizontal path 502. For this leading-end alignment of the image and the recording sheet, a configuration for driving the registration roller 105 based on a signal synchronized with image formation can be adopted.

The recording sheet to which the image is transferred passes through a fixing unit 13. The fixing unit 13 applies pressure and heat, thereby fixing the image to the recording sheet.

The recording sheet to which the image is fixed is conveyed toward the inserter 3 by a sheet discharge roller 151. Whether the recording sheet has been received by the inserter 3 at a predetermined timing is confirmed using a sheet discharge sensor 152. In a case where the recording sheet remains even if the predetermined timing is passed, a dwell jam takes place and the conveyance stops.

(Inserter)

The inserter 3 receives the recording sheet having the image formed by the image forming apparatus 1, via the sheet discharge roller 151. The recording sheet discharged from the image forming apparatus 1 enters the inserter 3. When the recording sheet is detected by an entry sensor 311 of the inserter 3, an entry roller 301 is driven to convey the recording sheet toward a horizontal path 340. When the recording sheet passes through a sheet discharge roller 302, the recording sheet is directly discharged to a sheet discharge tray 350 of the inserter 3. A sheet discharge sensor 312 is provided to detect the normal discharge of a recording sheet to the sheet discharge tray 350.

A drive system for the recording sheet having the image formed by the image forming apparatus 1 has been described. From here, a drive system for conveying an interleaf fed from an interleaf tray 320 of the inserter 3 will be described.

The inserter 3 includes the interleaf tray 320 for loading, feeding, and conveying an interleaf. The uppermost sheet among sheets stacked in the interleaf tray 320 is conveyed downstream by a sheet feeding roller 303. Using a separation roller 304, only the uppermost sheet is conveyed to a conveyance path 330. The interleaf guided to the conveyance path 330 is conveyed for a predetermined amount from a registration sensor 314. Subsequently, the leading end of the interleaf in a conveyance direction abuts a registration roller 305 being at rest, and the interleaf thereby temporarily stops while forming a loop. This corrects skew of the interleaf occurring during the feeding-conveyance operation.

After the interleaf stops for a predetermined time while the leading end remains abutting the registration roller 305, the separation roller 304, the registration roller 305, and the sheet discharge roller 302 are driven. The interleaf is thereby discharged to the sheet discharge tray 350 via a merging point of the conveyance path 330 and the horizontal path 340.

Figure 2:
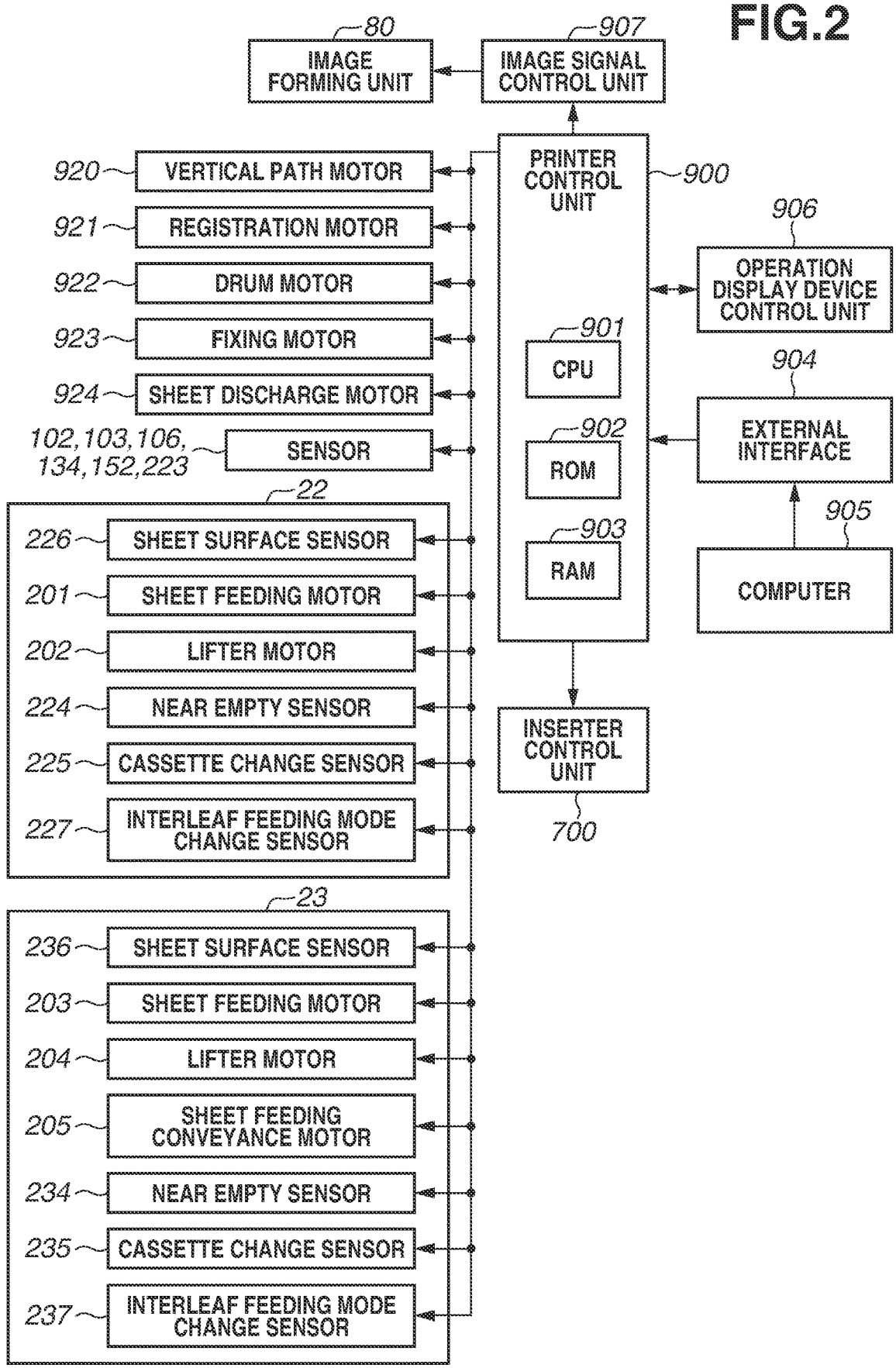
FIG. 2 is a block diagram illustrating the image forming apparatus.

FIG. 2 illustrates a configuration of a controller for controlling the image forming apparatus 1. The controller has a printer control unit 900. The printer control unit 900 has a central processing unit (CPU) 901, a read only memory (ROM) 902, and a random access memory (RAM) 903. The CPU 901 controls an image signal control unit 907, an operation display device control unit 906, and the image forming apparatus 1, by executing a program stored in the ROM 902.

The RAM 903 is a volatile memory for temporarily storing data, or used as a work area of the CPU 901. The image signal control unit 907 performs various kinds of processing on a digital image signal input from a computer 905 via an external interface 904. The image signal control unit 907 converts this digital image signal into a video signal, and outputs the video signal to the image forming unit 80. The operation display device control unit 906 controls the user interface 11, and exchanges information with the printer control unit 900.

The user interface 11 has a plurality of keys for setting various functions related to image formation, and a display unit for displaying information indicating a setting state. Further, the user interface 11 outputs a key signal corresponding to operation of each key to the printer control unit 900, and displays corresponding information based on a signal from the printer control unit 900 on the display unit.

Next, a main sheet-conveyance drive system of the image forming apparatus 1 will be described with reference to FIGS. 1 and 2.

A sheet feeding motor 201 and a vertical path motor 920 are each provided as a driving source from the sheet feeding unit 22 to the vertical path 501. The sheet feeding motor 201 drives the pickup roller 221. The vertical path motor 920 drives the sheet feeding roller 222 and the vertical path roller 101.

A sheet feeding motor 203 and the vertical path motor 920 are each provided as a driving source from the sheet feeding unit 23 to the horizontal path 502. The sheet feeding motor 203 drives the pickup roller 231. The vertical path motor 920 drives the sheet feeding roller 232 and a conveyance roller 190.

The sheet feeding units 22 and 23 have the near empty sensors 224 and 234, respectively. The near empty sensor 224 detects if the amount of recording sheets loaded in the paper storage 220 has fallen below a predetermined amount. The near empty sensor 234 detects if the amount of recording sheets loaded in the paper storage 230 has fallen below a predetermined amount. Further, the sheet feeding units 22 and 23 have the cassette change sensors 225 and 235, respectively. The cassette change sensors 225 and 235 each detect if the recording-sheet remaining amount in the paper-remaining ACC control has reached a remaining amount for starting sheet-feeding preparation of a change-destination sheet feeding unit.

A registration motor 921 is provided as a driving source from the horizontal path 502 to a transfer section. The registration motor 921 drives the pre-registration roller 104 and the registration roller 105.

A drum motor 922, a fixing motor 923, and a sheet discharge motor 924 are each provided as a driving source from the transfer section to a sheet discharge section. The drum motor 922 drives the drums 801 to 804, the intermediate transfer member 805, and the secondary transfer unit 806, in the image forming unit 80. The fixing motor 923 drives the fixing unit 13. The sheet discharge motor 924 drives the sheet discharge roller 151.

Further, the sensors 102, 103, 106, 134, 152, and 223 are provided for input signals to detect the passage of a sheet.

A recording sheet passing through the sheet discharge roller 151 is received by the inserter 3 controlled by an inserter control unit 700.

Figure 3:
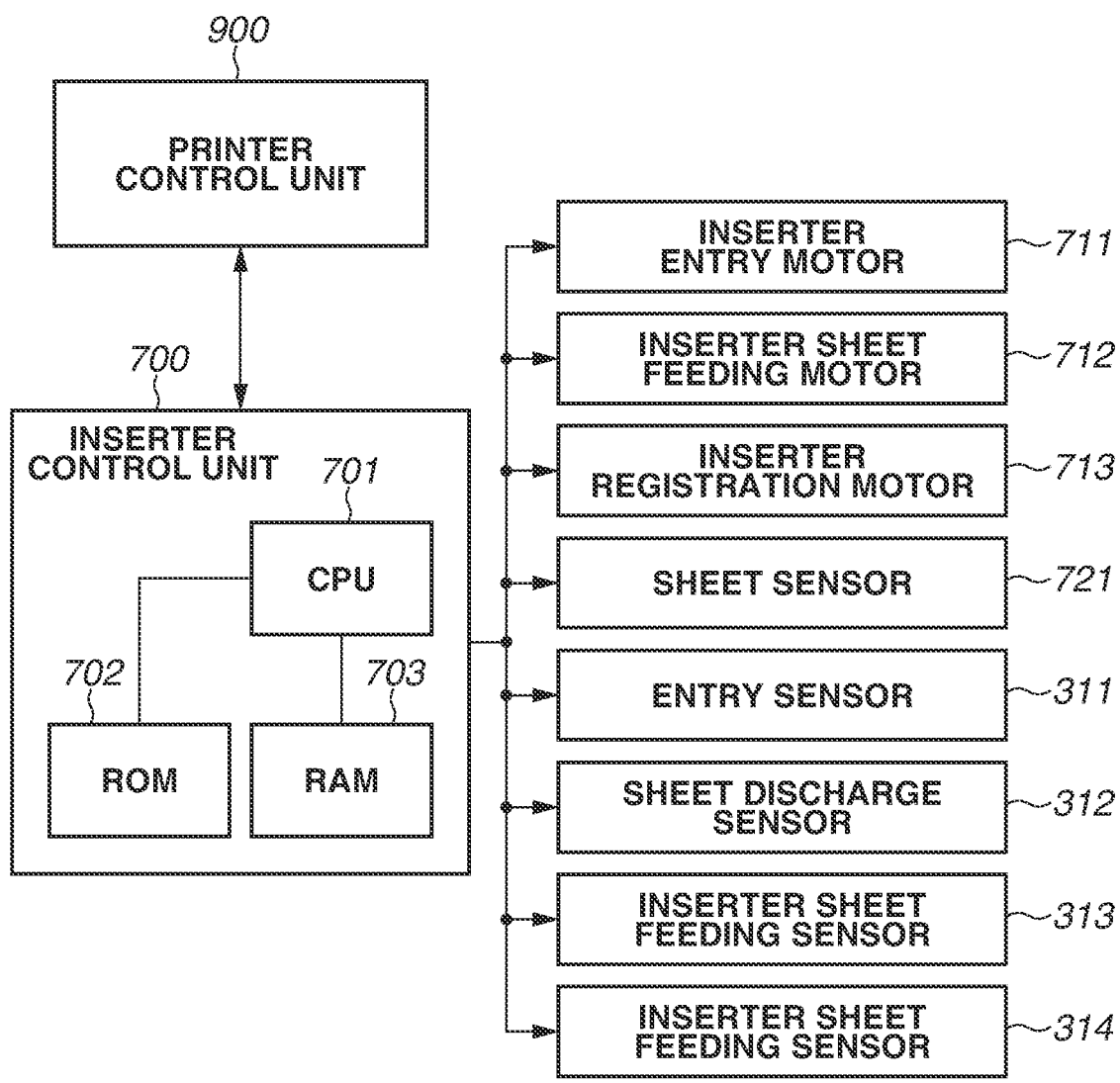
FIG. 3 is a block diagram illustrating an inserter control unit.

FIG. 3 is a block diagram illustrating a configuration of the inserter control unit 700 in FIG. 2. The inserter control unit 700 has a CPU 701, a ROM 702, and a RAM 703. The CPU 701 controls the inserter 3 by executing a control program stored in the ROM 702. The RAM 703 is a volatile memory for temporarily storing data, or used as a work area of the CPU 901.

Next, a sheet-conveyance drive system of the inserter 3 will be described with reference to FIGS. 1 and 3. The inserter 3 has an inserter entry motor 711, as a driving source for conveying a recording sheet received from the image forming apparatus 1 to the sheet discharge tray 350. The inserter entry motor 711 drives the entry roller 301 and the sheet discharge roller 302.

The inserter 3 further has an inserter sheet feeding motor 712, as a driving source from drawing in of an interleaf from the interleaf tray 320 and to skew correction on the conveyance path 330. The inserter sheet feeding motor 712 drives the sheet feeding roller 303 and the separation roller 304.

The inserter 3 further has an inserter registration motor 713, as a driving source from the skew correction of an interleaf fed from the interleaf tray 320 to the conveyance of the interleaf to a merging point with the image forming apparatus 1. The inserter registration motor 713 drives the registration roller 305.

The interleaf tray 320 includes a sheet sensor 721 (a first detection unit). The sheet sensor 721 detects the presence or absence of an interleaf in the interleaf tray 320. In a case where a plurality of interleaves is loaded in the interleaf tray 320, the presence or absence of the next interleaf can be detected only after the immediately preceding interleaf passes through the sheet sensor 721. Moreover, the sensors 311, 312, and 313, and a sensor 314 are provided to detect the passage of a sheet.

The configuration of each of the image forming apparatus 1 and the inserter 3 has been described. Next, interleaf-feeding control will be described.

In the present exemplary embodiment, two modes will each be described as a mode of performing control for feeding an interleaf from the inserter 3. The one mode is referred to as the "sheet-presence confirmed sheet-feeding mode". In a case where an interleaf is to be fed from the inserter 3 in the sheet-presence confirmed sheet-feeding mode, the feeding of the interleaf is determined to be possible after a recording sheet immediately before the insertion of the interleaf is determined to be present in the sheet feeding unit 22 of the image forming apparatus 1. The interleaf is then fed. In the sheet-presence confirmed sheet-feeding mode, there is a feeding preparation time (hereinafter referred to as "actual feeding delay") from when the feeding of the interleaf is determined to be possible until when the interleaf is actually fed. This actual feeding delay increases the distance between the immediately preceding recording sheet and the interleaf, thereby reducing the productivity.

The other mode is referred to as the "not confirmed sheet-feeding". In a case where an interleaf is to be fed from the inserter in the not confirmed sheet-feeding mode, the feeding of the interleaf begins, without waiting for the determination of the presence or absence of a recording sheet immediately before the insertion of the interleaf. Therefore, the productivity can be improved as compared with the sheet-presence confirmed sheet-feeding mode. However, in the not confirmed sheet-feeding mode, there is a case where the recording sheet immediately before the insertion of the interleaf is found to be absent in the sheet feeding unit, after the feeding of the interleaf begins. In this case, the fed interleaf remains inside as a jammed sheet. This is because, if this interleaf is forcibly discharged, the page order of a product becomes incorrect.

Each of the sheet-presence confirmed sheet-feeding mode and the not confirmed sheet-feeding mode will be described in detail below.

(Interleaf-Feeding Control in Sheet-Presence Confirmed Sheet-Feeding Mode)

Figure 4:
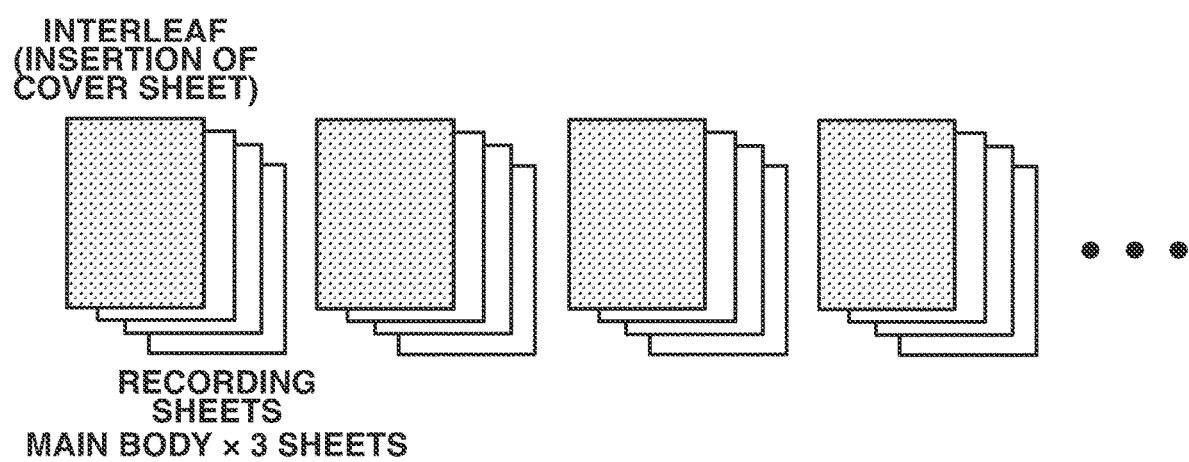
FIG. 4 is a diagram illustrating an example of an image forming job for inserting an interleaf between recording sheets.
Figure 5A:
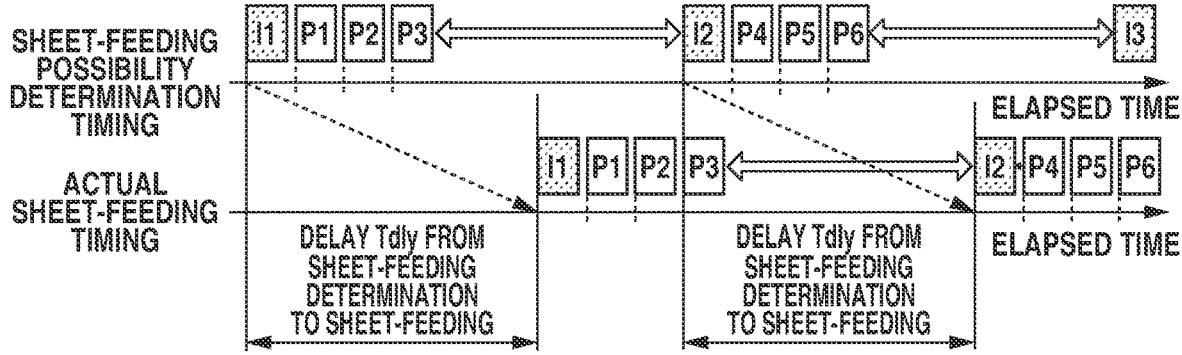
FIGS. 5A, 5B, 5C, and 5D are diagrams illustrate a relationship between sheet-feeding possibility determination timing and actual sheet-feeding timing for an interleaf.

FIG. 4 is a diagram illustrating a job for outputting a plurality of bundles. Each of the bundles is formed of three pages of a main body and an interleaf (a cover sheet). The interleaf is inserted as the top of the bundle. FIG. 5A is a diagram illustrating a relationship between sheet-feeding possibility determination timing and actual sheet-feeding timing, of each page of the job in FIG. 4. Here, an example in which recording sheets are fed from the sheet feeding unit 22 serving as the first sheet feeding unit will be described.

First, the sheet-feeding possibility determination is performed for an interleaf I1 to be inserted on the top of the first copy. The interleaf I1 is the top sheet, and the top sheet can be unconditionally fed, because there is no immediately preceding sheet.

The interleaf I1 is a sheet fed from the inserter 3, and actually, image formation is not performed for the interleaf I1 by the image forming apparatus 1. However, in the present exemplary embodiment, image formation for blank sheet data (a blank image) is performed for the interleaf I1 as pseudo-image formation, and interleaf dummy conveyance is performed in the image forming apparatus 1 in synchronization with the formation of this blank sheet image.

In the present exemplary embodiment, the time from when an image is formed on the drum 801 until when the image arrives at the secondary transfer unit 806 via the intermediate transfer member 805 is longer than the time from when a sheet is fed from the sheet feeding unit 22 until when the sheet arrives at the secondary transfer unit 806. Therefore, even if the image formation begins immediately after the sheet-feeding possibility determination, the sheet cannot be fed unless the sheet arrives at a position (a position POST of FIG. 5C) where the image is present. For this reason, the actual sheet-feeding timing comes after a lapse of a time Tdly following the determination of the possibility of the sheet feeding. The time Tdly is referred to as "actual feeding delay". In the present exemplary embodiment, the actual feeding delay Tdly is about 5 seconds.

The sheet-feeding possibility determination for a recording sheet P1 following the interleaf I1 can be performed when the presence of the interleaf I1 is determined. Here, because the presence of the interleaf I1 in the interleaf tray 320 is determined, the feeding of the recording sheet P1 is also determined to be possible.

Recording sheets P2 and P3 are sheets in the same sheet feeding unit of the recording sheet P1. Therefore, even if running out of sheets unexpectedly occurs, no sheet is likely to remain, and change of places in the order of a product is unlikely to occur. Hence, the feeding of the recording sheets P2 and P3 is also determined to be possible.

Next, the sheet-feeding possibility determination for an interleaf I2 to be inserted on the top of the second copy will be described. The interleaf I2 is a sheet to be fed from a sheet feeding origin different from that of the immediately preceding recording sheet P3. Therefore, the feeding of the interleaf I2 is determined to be possible only after the recording sheet P3 is determined to be present. The presence or absence of the recording sheet P3 is detected, after the immediately preceding recording sheet P2 is actually fed and then the trailing end of the recording sheet P2 passes through the sheet feeding sensor 223.

In this way, the sheet-feeding possibility determination for an interleaf to be inserted on the top of each of the second and subsequent copies is delayed, until the presence of the immediately preceding recording sheet is detected. Therefore, the actual feeding of the interleaf is also delayed by the delay of the sheet-feeding possibility determination. This increases the distance between the recording sheet P3 and the interleaf I2, which leads reduction in the productivity.

Figure 5B:
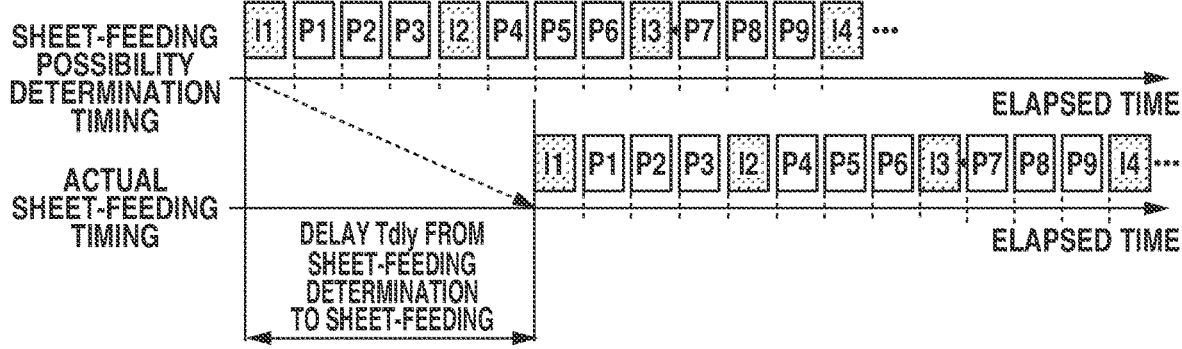
Figure 5C:
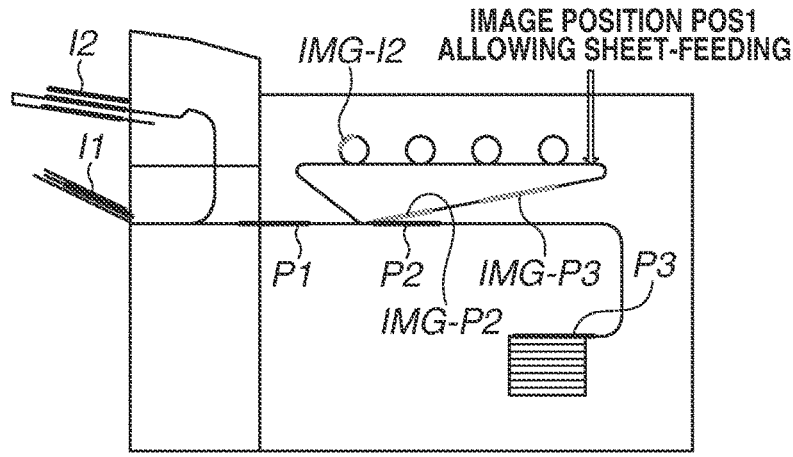

FIG. 5C illustrates a positional relationship between a sheet and an image in the sheet-presence confirmed sheet-feeding mode. FIG. 5C illustrates the interleaves I1 and I2, the recording sheets P1, P2, and P3, as well as images IMG-P2, IMG-P3, and IMG-I2. The images MG-P2, IMG-P3, and IMG-I2 correspond to the recording sheet P2, the recording sheet P3, and the interleaf I2, respectively. The image IMG-I2 corresponds to the interleaf I2 and thus is a blank image. The formation of the image IMG-I2 begins, after the presence of the recording sheet P3 is determined and the feeding of the interleaf I2 is determined to be possible. Therefore, the distance between the image IMG-I2 and the image IMG-P3 increases. The interleaf I2 is fed in synchronization with the timing at which the image IMG-I2 arrives at the inserter 3 after passing through the secondary transfer unit 806. In other words, the distance between the sheets excessively increases by the time difference from when the image is formed on the recording sheet P3 until when the image is formed on the interleaf I2.

(Interleaf-Feeding Control in not Confirmed Sheet-Feeding Mode)

FIG. 5B illustrates a relationship between sheet-feeding possibility determination timing and sheet-feeding timing in the not confirmed sheet-feeding mode, for the job illustrated in FIG. 4.

For the first copy, control is performed based on the timing similar to that of the interleaf insertion following the determination of the existence of a recording sheet. In the sheet-feeding possibility determination for the interleaf I2 to be inserted as the top of the second copy, even if the presence of the immediately preceding recording sheet P3 is not yet determined, sheet feeding is determined to be possible without confirmation, and operation for drawing in the interleaf I2 begins. In this case, because there is no wait for the determination of the presence of the recording sheet P3, the actual feeding of the recording sheet P2 is not delayed. Thus, productivity is not declined. However, in a case where the recording sheet P3 is found to be absent after the recording sheet P2 is fed, the order of a product becomes incorrect if the interleaf I2 is discharged.

Figure 5D:
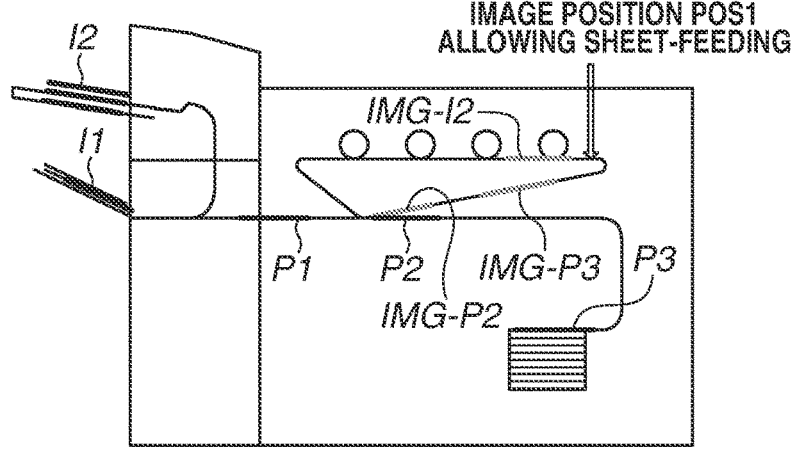

FIG. 5D illustrates a positional relationship between a sheet and an image in the not confirmed sheet-feeding mode. In the not confirmed sheet-feeding mode, the distance between the image IMG-P3 and the image IMG-I2 is not excessively increased because the feeding of the interleaf I2 is determined without a wait for the determination of the presence of the recording sheet P3. Therefore, the interleaf is fed based on the timing at which the image IMG-I2 arrives at the inserter 3. Hence, there is no increase in the distance between the sheets, causing no decline in productivity.

(Change Between Sheet-Presence Confirmed Sheet-Feeding Mode and not Confirmed Sheet-Feeding Mode)

Next, a change between the sheet-presence confirmed sheet-feeding mode and the not confirmed sheet-feeding mode will be described.

As described above, in the case where the interleaf-feeding control is the not confirmed sheet-feeding mode, the sheet-feeding possibility determination is performed for the interleaves I2 and I3 of the second and subsequent copies, without a wait for the determination of the presence or absence of the immediately preceding recording sheets P3 and P6. Therefore, there is a possibility that the absence of the immediately preceding recording sheet may be detected after the interleaf is fed. However, the absence of the sheet can be predicted beforehand, if the recording-sheet remaining amount of the sheet feeding unit, which stores the recording sheet immediately before the insertion of the interleaf, is obtained. In other words, the sheet-feeding mode is changed from the not confirmed sheet-feeding mode to the sheet-presence confirmed sheet-feeding mode, based on the detection of a small amount of remaining recording sheets. This can prevent the discharge of an incorrect product due to unexpected absence of recording sheets, while suppressing a decline in productivity as much as possible.

A method for determining a sheet-feeding timing for an interleaf based on a recording-sheet remaining amount will be described below.

FIG. 6 is a schematic diagram of a sheet-feeding control mode change for an interleaf. A case where 1,000 recording sheets are loaded in the paper storage 220 of the sheet feeding unit 22 will be described as an example, with reference to FIG. 6. When the job in FIG. 4 is executed, three recording sheets per copy are fed from the sheet feeding unit 22. In a state where the remaining recording sheets are 1,000, the absence of paper does not occur. Therefore, when the job is started, the sheet-feeding control is performed in the not confirmed sheet-feeding mode. The recording-sheet remaining amount decreases from the initial 1,000 sheets, as the job continues. After a while, the near empty sensor 224 detects if the amount of recording sheets remaining in the sheet feeding unit 22 has fallen below 100 sheets. When the near empty sensor 224 detects the recording-sheet remaining amount falling below 100 sheets, the sheet-feeding control mode is changed from the not confirmed sheet-feeding mode to the sheet-presence confirmed sheet-feeding mode. This is to prevent an interleaf remaining jam from occurring due to the absence of a recording sheet.

(Flowchart Illustrating Interleaf-Feeding Control)

The ACC and the interleaf-feeding control will be described with reference to FIGS. 7A, 7B, and 7C. As illustrated, operation is possible while the not confirmed sheet-feeding mode is kept as the interleaf-feeding control, in the paper-remaining ACC.

In the present exemplary embodiment, information of each page of a job is queued in the RAM 903. This information of each page includes sheet-feeding-unit information that indicates from which sheet feeding unit a sheet corresponding to the page is to be fed. Further, the mode of the ACC is selectable by a user. The mode set via the user interface 11 is stored in the RAM 903. Furthermore, the state of the sheet feeding unit and the state of the inserter 3 are stored in the RAM 903.

First, when a job stars, in step S1001, the CPU 901 determines whether a page to be processed is an interleaf. In a case where the CPU 901 determines that the page is an interleaf (YES in step S1001), the processing proceeds to step S1002. In step S1002, the CPU 901 performs an interleaf feeding determination. The interleaf feeding determination will be described with reference to FIG. 7B. In a case where the CPU 901 determines that the page is not an interleaf (NO in step S1001), the processing proceeds to step S1003. In step S1003, the CPU 901 performs a recording-sheet feeding determination. This processing will be described with reference to FIG. 7C.

Figure 7A:
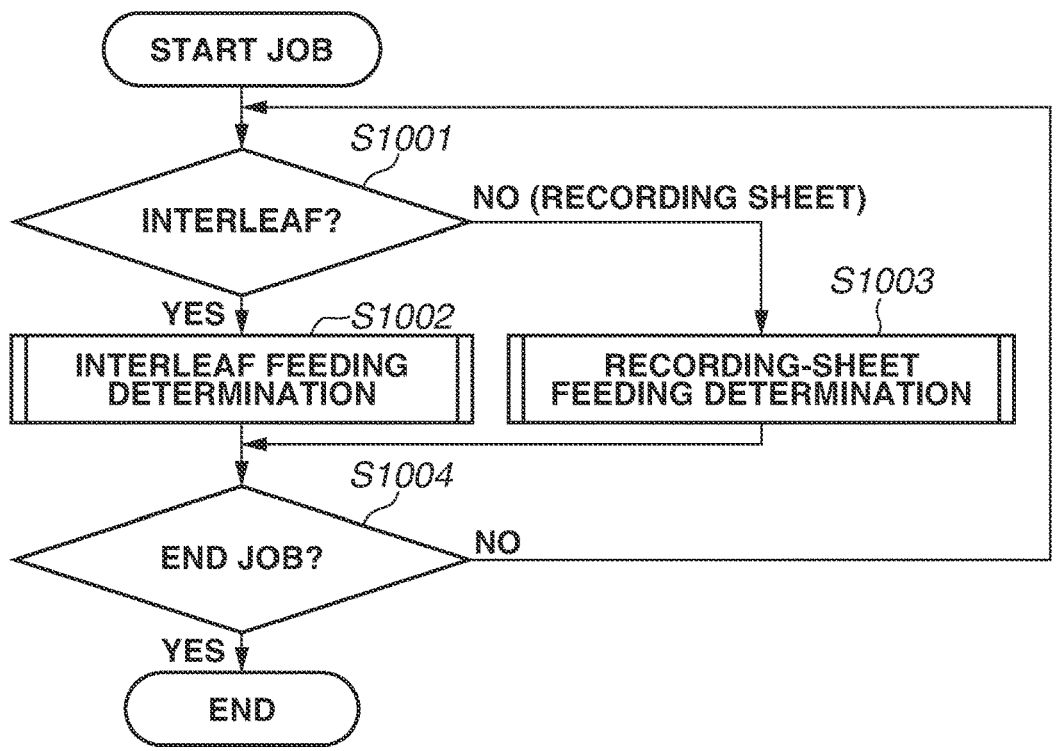
FIGS. 7A, 7B, and 7C are flowcharts illustrating sheet-feeding control according to an exemplary embodiment.
Figure 7B:
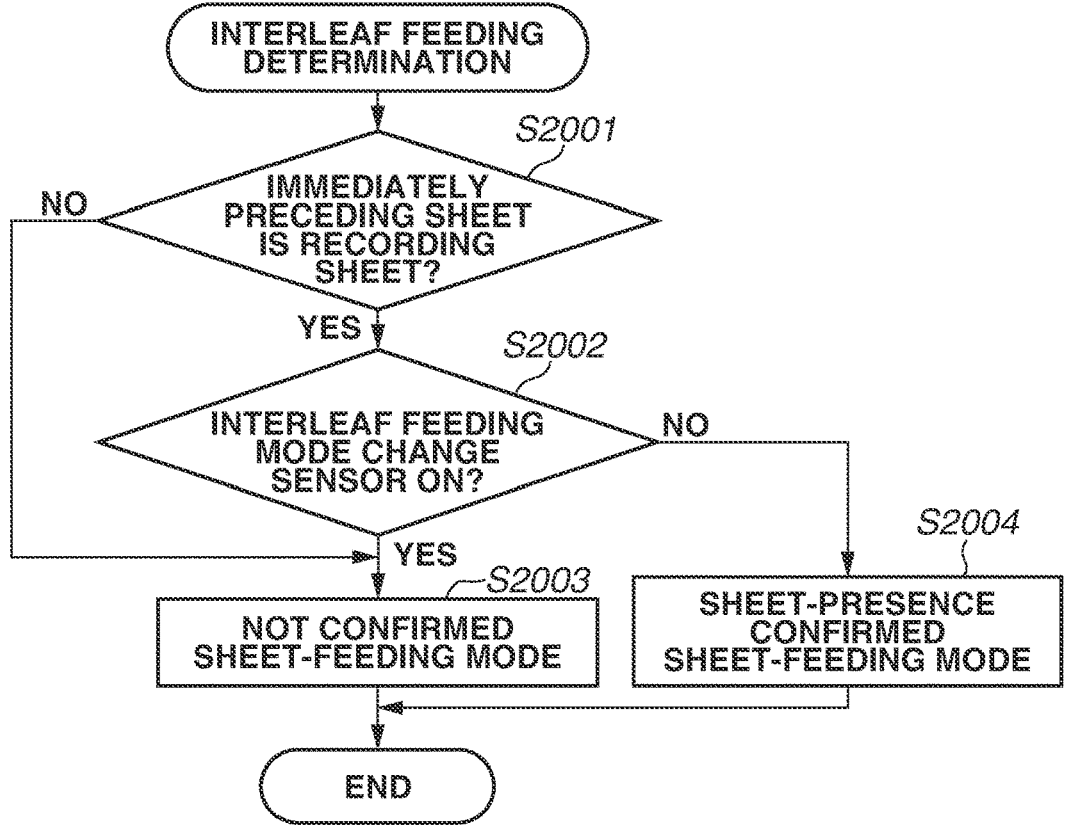

FIG. 7B is a flowchart illustrating the details of step S1002. In step S2001, from the RAM 903, the CPU 901 reads out information of a sheet (an immediately preceding sheet) fed immediately before, and determines whether the immediately preceding sheet is a recording sheet. In a case where the sheet feeding unit of the immediately preceding sheet is the sheet feeding unit 22 or the sheet feeding unit 23 (YES in step S2001), the processing proceeds to step S2002. In a case where the CPU 901 determines that the immediately preceding sheet is a not recording sheet (NO in step S2001), the processing proceeds to step S2003. In step S2003, the CPU 901 stores information, which indicates that the interleaf control mode is the not confirmed sheet-feeding mode, into the RAM 903. The processing in FIG. 7B then ends.

In step S2002, the CPU 901 determines whether a recording-sheet remaining amount in the paper storage, from which the immediately preceding sheet is fed, is more than a threshold used in the detection by the interleaf feeding mode change sensor. Specifically, the CPU 901 determines whether the interleaf feeding mode change sensor 227 or 237 is ON. In a case where the interleaf feeding mode change sensor 227 or 237 is ON (YES in step S2002), the CPU 901 determines that the recording-sheet remaining amount is large, and the processing proceeds to step S2003. In step S2003, the CPU 901 stores information, which indicates that the interleaf control mode is the not confirmed sheet-feeding mode, into the RAM 903. The processing in FIG. 7B then ends.

In a case where the interleaf feeding mode change sensor 227 or 237 is OFF (NO in step S2002), the CPU 901 determines that the recording-sheet remaining amount is small, and the processing proceeds to step S2004. In step S2004, the CPU 901 stores information, which indicates that the interleaf control mode is the sheet-presence confirmed sheet-feeding mode, into the RAM 903. The processing in FIG. 7B then ends.

Figure 7C:
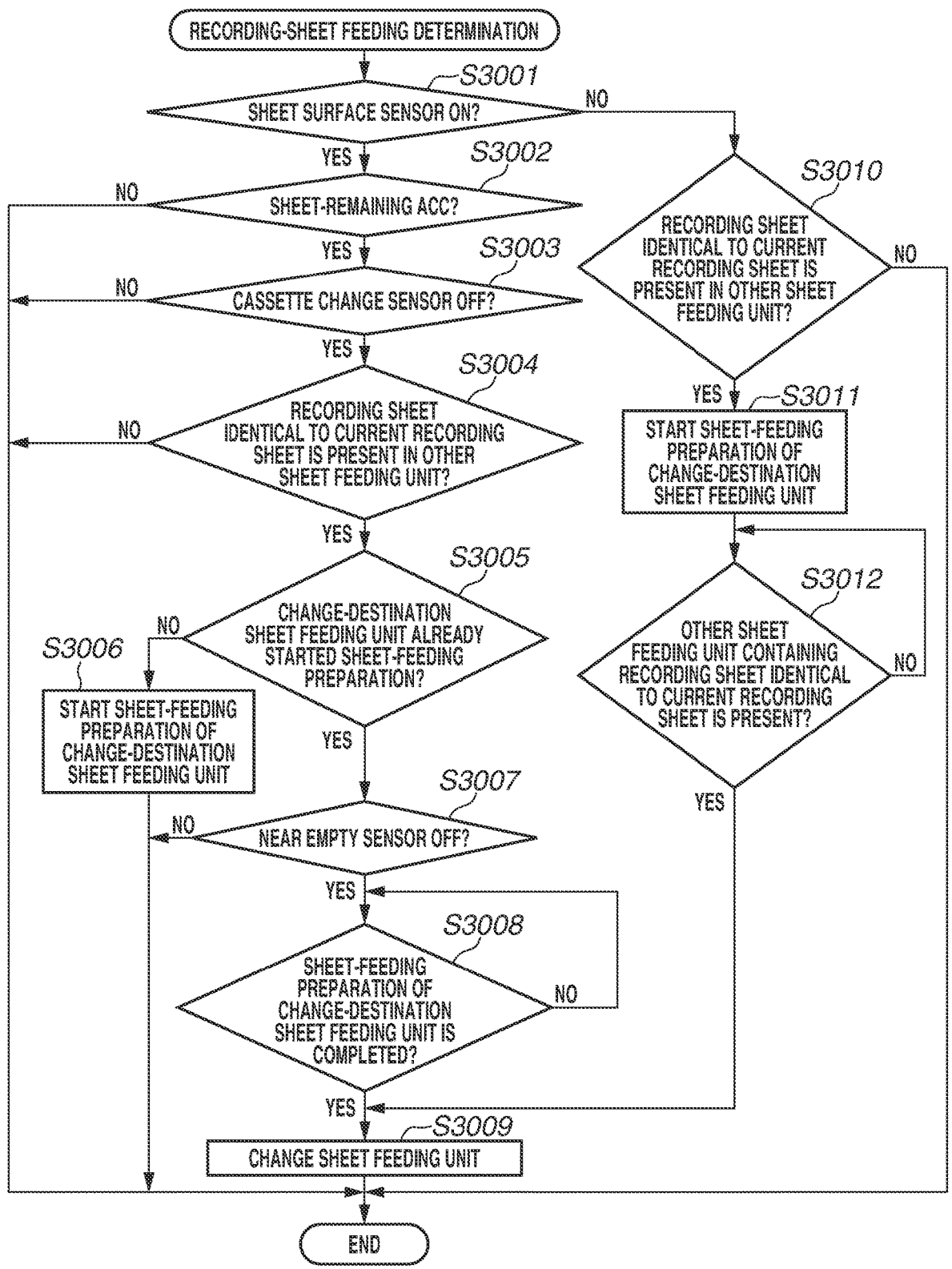

FIG. 7C is a flowchart of the processing to be executed in a case where the page to be processed is determined to be a recording sheet in step S1001.

In step S3001, the CPU 901 determines whether the sheet surface sensor 226 or 236 being ON is detected. A description will be provided first for a case where the sheet surface sensor 226 or 236 being ON is detected in step S3001. In a case where the sheet surface sensor 226 or 236 being ON is detected (YES in step S3001), the CPU 901 determines that a sheet is present. The processing then proceeds to step S3002.

In step S3002, the CPU 901 determines whether the ACC mode stored in the RAM 903 is the sheet-remaining ACC. In a case where the CPU 901 determines that the ACC mode is the sheet-remaining ACC (YES in step S3002), the processing proceeds to step S3003. In a case where the CPU 901 determines that the ACC mode is not the sheet-remaining ACC (NO in step S3002), the recording-sheet feeding determination ends, without changing the sheet feeding unit.

In step S3003, the CPU 901 determines whether the cassette change sensor 225 or 235 is OFF. In a case where the CPU 901 determines that the cassette change sensor 225 or 235 is OFF (YES in step S3003), the processing proceeds to step S3004. In a case where the CPU 901 determines that the cassette change sensor 225 or 235 is not OFF (NO in step S3003), the recording-sheet feeding determination ends, without changing the sheet feeding unit.

In the present exemplary embodiment, the cassette change sensor is OFF, when the sheet remaining amount is larger than the threshold for the detection by each of the near empty sensor and the interleaf feeding mode change sensor. Therefore, at this moment, the interleaf feeding mode is the not confirmed sheet-feeding mode. In other words, before a change from the not confirmed sheet-feeding mode to the sheet-presence confirmed sheet-feeding mode, the operation preparatory to the sheet-feeding-unit change to be described below begins.

In step S3004, the CPU 901 determines whether a recording sheet of type and size identical to those of the currently-fed recording sheet is present in other sheet feeding unit. In a case where the identical recording sheet is present (YES in step S3004), the processing proceeds to step S3005. In a case where the identical recording sheet is not present (NO in step S3004), the recording-sheet feeding determination ends, without changing the sheet feeding unit.

In step S3005, based on the state of the sheet feeding unit stored in the RAM 903, the CPU 901 determines whether a change-destination sheet feeding unit has started sheet-feeding preparation. In a case where the CPU 901 determines that the sheet-feeding preparation has been started (YES in step S3005), the processing proceeds to step S3007.

In step S3007, the CPU 901 determines whether the near empty sensor of the paper storage in the current sheet-feeding is OFF. In a case where the CPU 901 determines that the near empty sensor is not OFF (NO in step S3007), the recording-sheet feeding determination ends, without changing the sheet feeding unit. In a case where the CPU 901 determines that the near empty sensor is OFF (YES in step S3007), the processing proceeds to step S3008.

In step S3008, the CPU 901 determines whether the preparation of the change-destination sheet feeding unit is completed. In a case where the CPU 901 determines that the preparation of the change-destination sheet feeding unit is completed (YES in step S3008), the processing proceeds to step S3009. In step S3009, the CPU 901 changes the sheet feeding unit, and the recording-sheet feeding determination ends. In a case where the CPU 901 determines that the preparation of the change-destination sheet feeding unit is not completed (NO in step S3008), the CPU 901 repeats the determination until the preparation is completed.

In step S3005, in a case where the CPU 901 determines that the change-destination sheet feeding unit has not started the sheet-feeding preparation (NO in step S3005), the processing proceeds to step S3006.

In step S3006, the CPU 901 starts the sheet-feeding preparation of the change-destination sheet feeding unit. The CPU 901 then stores information, which indicates that the preparation has started, at the state of the change-destination sheet feeding unit in the RAM 903. Afterward, the recording-sheet feeding determination ends, without changing the sheet feeding unit.

Next, a description will be provided for a case where the sheet surface sensor 226 or 236 being OFF is detected in step S3001. In a case where the sheet surface sensor 226 or 236 being OFF is detected (NO in step S3001), the CPU 901 determines that no sheet is present. The processing then proceeds to step S3010. The case where the CPU 901 determines that no sheet is present in step S3001 is a case where the mode of the ACC is the no-paper ACC mode (a first mode).

In step S3010, the CPU 901 determines whether a recording sheet of type and size identical to those of the currently-fed recording sheet is present in other sheet feeding unit. In a case where the identical recording sheet is present in other sheet feeding unit (YES in step S3010), the processing proceeds to step S3011. In a case where the identical recording sheet is not present in other sheet feeding unit (NO in step S3010), information indicating the absence of a recording sheet is stored into the RAM 903, and the processing in FIG. 7C ends.

In step S3011, the CPU 901 starts the sheet-feeding preparation of a change-destination sheet feeding unit. The processing then proceeds to step S3012. In step S3012, the CPU 901 determines whether the preparation of the change-destination sheet feeding unit is completed, and repeats this determination until the sheet-feeding preparation is completed. In a case where the CPU 901 determines that the sheet-feeding preparation of the change-destination sheet feeding unit is completed (YES in step S3012), the processing proceeds to step S3009. In step S3009, the CPU 901 changes the sheet feeding unit, and the recording-sheet feeding determination ends.

Upon ending of the processing in FIG. 7C, the processing proceeds to step S1004.

In step S1004, the CPU 901 determines whether to end the job. Specifically, the CPU 901 determines whether there is no more pages to be fed for the page information queued in the RAM 903. In a case where there is no more page to be fed (YES in step S1004), this processing procedure ends.

Further, in step S1004, in a case where the information indicating the absence of a recording sheet is stored in the RAM 903, the CPU 901 displays running out of paper at the user interface 11.

In a case where the CPU 901 determines that the next page to be fed is queued in the RAM 903 (NO in step S1004), the processing returns to step S1001 to perform the determination again.

In this way, the operation in the flowchart in each of FIGS. 7A to 7C is performed. This operation allows control for changing the sheet feeding unit of recording sheets by using the near empty sensors 224 and 234, before changing the interleaf control mode to the sheet-presence confirmed sheet-feeding mode by using the interleaf feeding mode change sensors 227 and 237. Therefore, in the operation in the paper-remaining ACC, the operation in the not confirmed sheet-feeding mode continues, without a change to the sheet-presence confirmed sheet-feeding mode for the feeding of an interleaf from the inserter 3. This can prevent a decline in productivity.

In the present exemplary embodiment, the interleaf feeding mode change sensors 227 and 237 are used to detect whether the recording-sheet remaining amount has fallen below the first threshold. In addition, the near empty sensors 224 and 234 are used to detect whether the recording-sheet remaining amount has fallen below the second threshold. However, the recording-sheet remaining amount can be compared with the threshold in other method. For example, the interleaf feeding mode change sensor and the near empty sensor is not used. In this case, for example, there can adopted a method for determining the height of a paper storage from a pulse of an encoder, and calculating a recording-sheet remaining amount based on this height of the paper storage.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-108239, filed May 31, 2017, which is hereby incorporated by reference herein in its entirety.

What is claimed is:

1. An image forming apparatus comprising:
a storage unit configured to store a recording sheet;
an image forming unit configured to form an image on a recording sheet fed from the storage unit;
a first detection unit configured to detect presence or absence of a recording sheet in the storage unit;
a second detection unit configured to detect a remaining amount of recording sheets in the storage unit;
an insertion unit including an interleaf tray configured to load an interleaf, fed from the interleaf tray, between recording sheets conveyed from the image forming unit; and
a control unit configured to control timing of start of interleaf feeding by the insertion unit, based on a detection result of the second detection unit,
wherein, in a case where the remaining amount of recording sheets in the storage unit is more than a first threshold, the control unit is configured to start interleaf feeding from the interleaf tray regardless of a detection result of the first detection unit,
wherein, in a case where the remaining amount of recording sheets in the storage unit is less than the first threshold, the control unit is configured to start interleaf feeding from the interleaf tray based on a detection result of the first detection unit,
wherein the image forming apparatus includes:
a first mode of changing a feeding origin of a recording sheet, according to detection of the absence of a recording sheet in the storage unit by the first detection unit during execution of an image forming job, and
a second mode of changing the feeding origin of a recording sheet, according to detection of a remaining amount of recording sheets in the storage unit being less than a second threshold, larger than the first threshold, during execution of the image forming job.

2. The image forming apparatus according to claim 1, wherein the insertion unit is provided downstream from the image forming unit in a recording-sheet conveyance direction.

3. The image forming apparatus according to claim 1, wherein, in a case where the second detection unit detects a small remaining amount of recording sheets in the storage unit, the control unit is configured to determine that a recording sheet immediately before insertion of an interleaf is present in the storage unit, based on a detection signal from the first detection unit, and the control unit is configured to start feeding the interleaf after a lapse of a feeding preparation time.

4. The image forming apparatus according to claim 1, wherein the control unit is configured to prepare for a change of the feeding origin of a recording sheet, based on detection of the remaining amount of recording sheets in the storage unit being less than a third threshold that is larger than the second threshold.

* * * * *